United States Patent Office 2,790,912
Patented Apr. 30, 1957

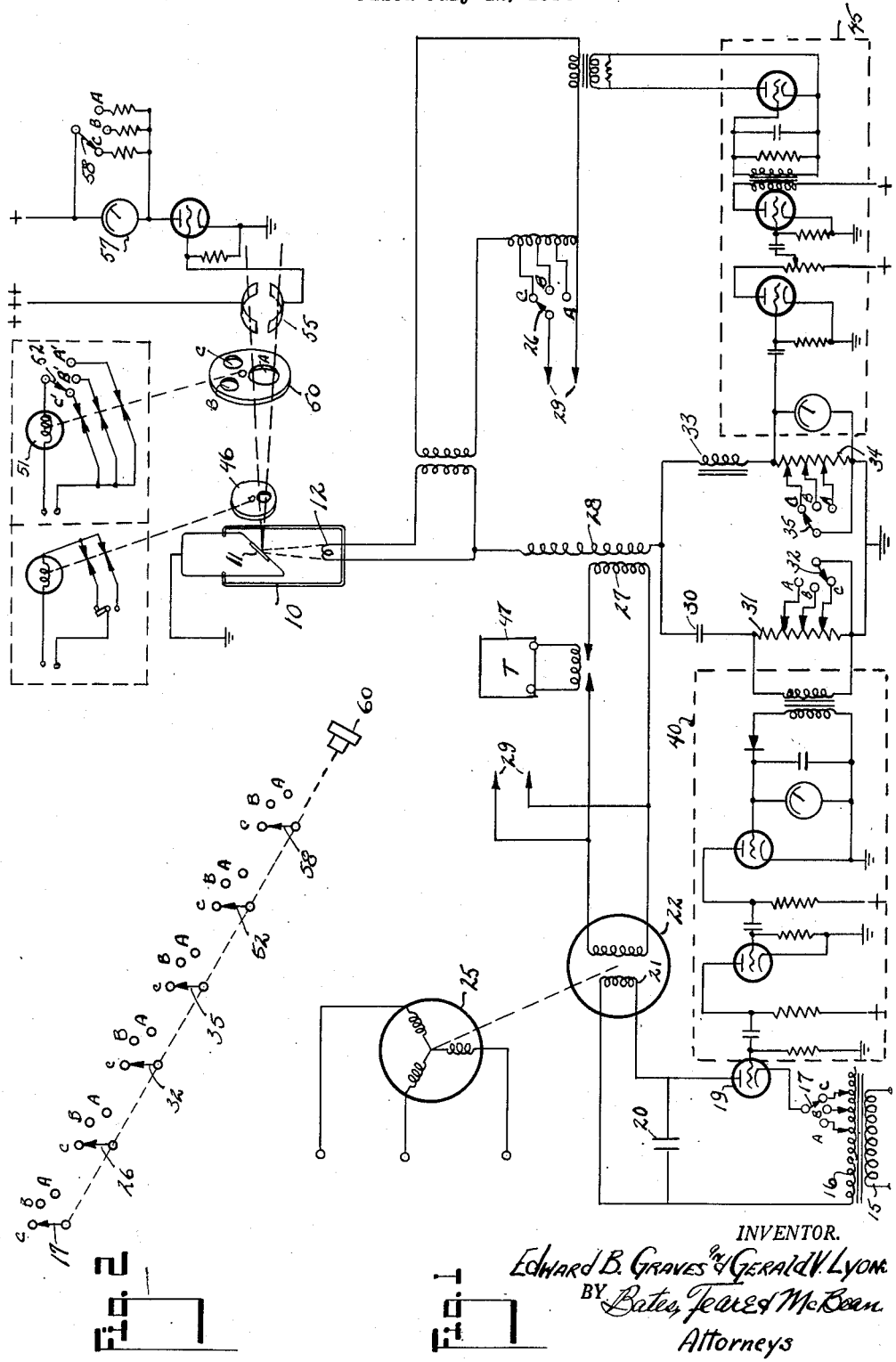

2,790,912

X-RAY CONTROL APPARATUS

Edward B. Graves, South Euclid, and Gerald V. Lyons, Cleveland, Ohio, assignors to Picker X-Ray Corporation, Waite Mfg. Div., Inc., Cleveland, Ohio, a corporation of Ohio Application July 12, 1954, Serial No. 442,484

2 Claims. (Cl. 250—97)

This invention relates to X-ray apparatus generally and more particularly relates to an improved arrangement for automatically controlling the operation of such apparatus with a single monitor control.

Heretofore, in the control of conventional X-ray apparatus, a selected operating condition for the apparatus corresponding to a desired type of therapy required independent adjustment of the operating voltage and the current with corresponding independent selection of the corresponding filter and independent calibration of meter devices for indicating the attained levels of each of these factors for the selected condition of operation. Thus, the usual control equipment included an instrument for measuring applied potential in terms of kilo-voltage and another for measuring the current in terms of milli-amperes along with the corresponding calibrating circuits each of which were independently adjusted by separate control elements and, in addition, there was provided a device for selecting and positioning the proper filter on the apparatus X-ray tube head.

With the conventional control features indicated it was necessary for an operator to first determine the quantity and quality (penetration) required for a particular diseased condition. Then, by means of charts he would translate these requirements into the tube voltage tube current, filtration and exposure time to provide the prescribed operating level. The initial determination of the operating level requirements in terms of quantity and quality is based on the fact that X-ray treatments are usually done on the basis of the rate of radiation in terms of Roentgens per minute and the quality of such radiation which usually is specified in terms of the half value layer. The half value layer is simply the measure of the filter which must be added to a base filter to reduce the initial radiation being measured by one-half. Thus, the harder or more penetrating the radiation the greater the amount of filter which must be added to reduce the initial value by one-half.

An ultimate desired objective then in the control of such X-ray apparatus is the attainment of a monitor control extending throughout the apparatus in such a way that the X-ray tube operating adjustments can automatically be made to a prescribed level for any selected condition of operation simply by adjusting a single monitor control member. In its preferred form, such monitoring arrangement also automatically selects and positions the filter corresponding to the selected condition of operation as well as calibrating a measuring device to indicate the rate of radiation corresponding to such condition of operation. Thus, for any condition of operation the ultimate adjustment can be ascertained in terms of selected radiation and quality, thereby providing a single monitor control for adjusting operation of the apparatus in terms of the desired type of therapy.

Briefly, the foregoing objective is attained in accordance with the present invention by providing an X-ray tube energizing circuit with a plurality of multiple contact switches each independently coacting in the energizing circuit to adjust and stabilize respectively the applied voltage and the X-ray tube current and to select and position the proper X-ray filter and to calibrate the radiation metering device wherein the selected adjustments are ultimately indicated as an X-ray operating level in terms of radiation quantity and quality. The multiple contacts of the switches are correlated to each other and correspond respectively to different conditions of operations for the X-ray apparatus in relation to different types of therapy. The switches are ganged together for unitary adjustment between the different conditions of operation by means of a single monitoring control device.

In the drawings, Fig. 1 schematically illustrates the X-ray tube energizing circuit and associated control elements; and Fig. 2 is a diagrammatic representation of the ganged monitor control for the multiple contact switches of the energizing circuit.

Referring now in greater detail to Fig. 1 of the drawings, there is shown an X-ray tube 10 having an anode 11 and a filament 12. The energizing circuit includes an input transformer whose primary 15 may be connected to a suitable alternating current source and whose secondary 16 has a plurality of taps A, B and C to provide different values of secondary voltage by adjusting the switch arm 17. The output of the secondary 16 is rectified at 19 and filtered by the capacitor 20 and then applied to the field winding 21 of an alternator 22 which is driven by a three-phase A. C. motor 25 and, in the form shown, produces a 1200 cycle single phase output. This high frequency single phase output is then fed from the alternator 22 to the primary 27 of a high voltage transformer and through a tap-off at 29 to the multiple tap input which varies the voltage at filament circuit of the X-ray tube 10 when switch arm 26 is positioned. The secondary 28 of the high voltage transformer has one end coupled to the tube filament 12 and has the other end coupled to a filter circuit having one branch including a condenser 30 and a multiple contact resistance 31 connected to ground. The other branch of the filter circuit is connected to ground through a suitable choke 33 and a multiple contact resistance 34.

The filter circuit operates in such manner that only the 1200 cycle component passes through the capacitive side while the D. C. component passes through the inductive side. The multiple contact resistance 31 may be adjusted by the switch arm 32 between positions A, B and C and reflects the adjusted A. C. drop into a voltage stabilizing circuit indicated generally at 40 which supplies a modulating signal to the rectifier 19 to control the D. C. field current applied to the alternator 22 and thereby stabilize the output at the selected operating potential. The multiple contact resistance 34 in the inductive or D. C. side of the filter circuit is similarly adjusted by the switch arm 35 between positions A, B and C to vary the input to the filament current circuit indicated generally at 45 which supplies a modulating signal to the filament circuit to stabilize the tube milliamperage at a selected value corresponding to the selected operating potential.

A suitable shutter 46 is rotated in operative proximity to the X-ray tube 10 and coacts with an electrically energized timer 47 which is energized from the output of the alternator 22 to fix the duration of the exposure.

There is also provided a variable filter shown in the diagrammatic form of a filter wheel 50 having a plurality of different filter values A, B, and C which may be adjustably positioned by rotation of the filter wheel. Energization of the filter drive motor 51 is controlled by timed relays A', B' and C' each of which may be selectively energized by positioning the switch arm 52 to rotate the filter wheel 50 so as to present the prescribed filter A, B or C corresponding to the selected circuit conditions of operation. Since each filter value corresponds to a predetermined half value layer, the quality of the filtered beam is known in terms of the active filter value.

The radiation of the X-ray output is measured by passing the beam through an ionization chamber 55 which has a meter 57 in conjunction therewith to indicate the radiation value in Roentgens per minute. The meter 57 may be calibrated for the different conditions of selected operation by interposing different values of resistance A, B, or C in the meter circuit. These values can be adjustably interposed in the meter circuit by positioning the multiple contact switch arm 58.

In operation, as related to the energizing circuit shown in the drawings, there are indicated three independent conditions A, B and C of operation for the apparatus. These might for exemplary purposes be said to correspond generally to types of therapy otherwise identified as "Superficial," "Intermediate" and "Deep" respectively, in terms of tissue absorption at a prescribed focal distance. It will be apparent that for a "Superficial" therapy each of the multiple contact control switches may be independently adjusted to the first position A to pre-set the operating levels for each controlled portion of the energizing circuit to provide an overall operating condition corresponding to this type of therapy. Similarly, should the operator desire to change from a "Superficial" to a "Deep" type of therapy, each of the individual control switches could be positioned to the third contact C. However, as hereinbefore noted, independent adjustment of each of the control switches puts an undue burden on the operator as well as inherently including the danger of a wrong selection of one of the contacts on one of the control switches. Therefore, as best shown in Fig. 2 of the drawings, this invention further contemplates the ganging together of all of the multiple contact control switch arms for simultaneous movement by means of a single monitoring control knob 60; this control knob being calibrated in terms of the ultimate measure of the desired type of therapy, namely in terms of radiation per minute and in terms of the half value layer corresponding to the particular pre-selected filter for the desired type of therapy.

This ganging together and monitoring control of all the controlled portions of the X-ray tube energizing circuit and apparatus is only possible when the adjusted values at each contact A, B and C are correlated to each other and in pre-determined relation to the conditions of operation corresponding to the desired types of therapy. In this manner it is possible to select and accurately maintain any one of a number of previously calibrated levels of X-ray output by simply adjusting a single monitor control and the output may be rated in terms of ultimate radiation quantity and quality for direct guidance of the operating radiologist.

We have shown and described what we consider to be the preferred embodiments of our invention along with similar modified forms and, it will be obvious to those skilled in the art that other changes and modifications may be made without departing from the scope of our invention as defined by the appended claims.

We claim:

1. An X-ray apparatus and control comprising in combination, an exciting circuit for supplying a selected operating voltage across the X-ray tube, an energizing circuit for heating the X-ray tube filament to a predetermined level corresponding to the selected operating voltage, a pair of stabilizing circuits, one of said stabilizing circuits coacting in said exciting circuit to maintain the selected operating voltage and the other of said stabilizing circuits coacting in said energizing circuit to maintain the selected level of X-ray tube milliamperage, filter means for selectively controlling the quality of X-radiation, meter means for measuring and indicating the rate of X-ray output and including a calibrating circuit, each of said circuits and said filter means having a plurality of adjusting means correlated to adjustments in the other circuits and each including a plural contact switch means, and operating means for movably positioning all of said switch means simultaneously as a unit to simultaneously adjust each of said circuits and said filter means to their correlated operating values.

2. A monitor control for X-ray apparatus comprising in combination, an exciting circuit for supplying an operating potential to the X-ray tube, a first control means operative in said circuit for selectively varying the operating potential in increments corresponding to different conditions of tube operation, adjustable means for stabilizing the applied potential at any of the selected increments of excitation, circuit means for energizing the X-ray tube filaments, a second control means operative in said energizing circuit to selectively vary the filament energization in increments correlated with the increments of operating potential and corresponding to the different conditions of tube operation, adjustable means for stabilizing X-ray tube milliamperage through control of the filament energization at any of the selected increments of energization, X-ray filter means for controlling the quality of the emerging X-ray radiation, a third control means operative to selectively vary the filter absorption in increments correlated to the increments of tube excitation and filament energization and corresponding to the different conditions of tube operation, meter means for measuring and indicating the rate of generated X-radiation, adjustable means for calibrating said meter means in increments correlated to the increments of tube excitation and filament energization, each of said control and adjustable means being coupled together for simultaneous adjustment in a correlated manner related to the different conditions of tube operation, and a single operating means for positioning said coupled control and adjustable means as a unit to control the level of operation of the apparatus.

References Cited in the file of this patent

UNITED STATES PATENTS

| 2,235,268 | Victoreen | Mar. 18, 1941 |
| 2,244,137 | Bischoff et al. | June 3, 1941 |
| 2,492,281 | Hall | Dec. 27, 1949 |
| 2,571,009 | Brown | Oct. 9, 1951 |
| 2,659,015 | Lee | Nov. 10, 1953 |